United States Patent

[11] 3,620,687

| [72] | Inventor | Archie S. Wilson<br>Richland, Wash. |
|---|---|---|
| [21] | Appl. No. | 818,822 |
| [22] | Filed | Apr. 23, 1969 |
| [45] | Patented | Nov. 16, 1971 |
| [73] | Assignee | The United States of America as represented by the United States Atomic Energy Commission |

[54] ORGANIC PHASE REDUCTION OF PLUTONIUM IN A PUREX-TYPE PROCESS
2 Claims, No Drawings

[52] U.S. Cl. .................................................. 23/341,
204/157.1, 204/158, 204/162, 252/301.1
[51] Int. Cl. ........................................................B01d 11/04,
B01j 1/10
[50] Field of Search............................................ 23/339,
341, 346, 347; 204/157.1, 158, 162; 252/301.1

[56] References Cited
UNITED STATES PATENTS
2,736,694  2/1956  Gunning et al. .............  204/157.1

3,120,479  2/1964  Dols et al. ................ 204/157.1
3,276,850  10/1966  Rainey .......  23/341
3,387,945  6/1968  Boudry et al. ............  23/341

FOREIGN PATENTS
1,113,237  5/1968  Great Britain.............  23/341

OTHER REFERENCES
Salomon et al.–Etude du Nitrate Uraneux Comme Reducteur du Platonium 11–b Influence Des Radiations Sur la Stabilite de l' U(IV) ETR– 182 pg. 5 3– 66 AEC Document NP 17663.

*Primary Examiner*–Carl D Quarforth
*Assistant Examiner*–F. M. Gittes
*Attorney*–Roland A Anderson ABSTRACT: An improved method for the reduction of uranium (VI) to uranium (IV) in a solvent presence process for reprocessing irradiated nuclear reactor fuels using tributyl phosphate (Purex Process) by subjecting uranyl nitrate in a tributyl phosphite—hydrocarbon solvent—acid media to ultraviolet light in the presence of a small amount of phosphoric acid.

3,620,687

ORGANIC PHASE REDUCTION OF PLUTONIUM IN A PUREX-TYPE PROCESS

CONTRACTUAL ORIGIN OF THE INVENTION

The invention described herein was made in the course of, or under, a contract with the United States Atomic Energy Commission.

BACKGROUND OF THE INVENTION

This invention relates to a method of reducing uranium (VI) to uranium (IV). More specifically, this invention relates to a method of reducing uranyl nitrate to uranium (IV) which in turn is used to reduce plutonium (IV) to plutonium (III) so that it may be separated from the uranium.

As the numbers of nuclear reactors increase, the methods and techniques for reprocessing the spent fuel which has been irradiated in these reactors must also be improved. This is necessary to speed up reprocessing and to improve recovery of uranium and plutonium so that these and other reactors under construction and planned for in the future may be fueled.

A number of methods have been developed to accomplish this fuel reprocessing, such as halide volatility processes, pyrometallurgical processes and solvent extraction processes. Of these processes, the solvent extraction process which utilized tributyl phosphate in a kerosene base is presently in use. This process is generally referred to as the Purex Process and is described in detail in "Reactor Handbook," Second Edition, Vol. II, "Fuel Reporcessing," Stoller and Richards, Interscience, 1961. This process relies upon the extractability of uranyl nitrate and the relative inextractability of plutonium (III) to separate these two elements. Because the plutonium is normally in the +4 state, it must be reduced in order to effect the separation.

A number of methods have been tried to effect this plutonium reduction; for example, ferrous sulfamate and sulfuric acid may be added to the organic phase containing the uranium and plutonium. The addition of the above compound leads to a number of problems. For example, the iron remains in the radioactive waste and its presence accelerates corrosion of the waste concentration equipment. Its presence also complicates treatment of the waste for byproduct recovery which is now becoming very important, and the additional compound adds to the total quantity of salts which must be stored, thus adding to the total process cost.

It has been discovered that uranium (IV) would act to reduce plutonium (IV) to plutonium (III); however, to accomplish this requires the addition of other material to reduce the uranium, which as uranyl nitrate is in the +6 state, to uranium (IV). For example, on one process the uranyl nitrate is reduced in the presence of sunlight with formic acid, formaldehyde or a similar organic reducing agent. In another process hydrazine is added to the solvent extraction process as a reductant of the uranium. In still another process uranium which has already been reduced is added to the solution. Although no substances foreign to the process are added, the additional uranium must be removed at some point in the process. In addition, if the uranium already present in the process is of a particular isotopic composition, the addition of the reduced uranium would act to upset this composition and necessitate a readjustment.

SUMMARY OF THE INVENTION

I have developed a method for reducing uranium (VI) to uranium (IV) which eliminates many of the problems enumerated above. By the process of my invention, tributyl phosphite [TBP(III)] is added to the organic phase containing the uranyl nitrate and plutonium (IV). A small amount of phosphoric acid is added to the solution and the resulting mixture is exposed to ultraviolet light. The uranyl nitrate is reduced to uranium (IV) which in turn reduces the plutonium (IV) present in the solution to plutonium (III) which can then be separated from the uranium. The tributyl phosphite is oxidized to tributyl phosphate (TBP) which is, of course, the organic phosphorus compound used as the extractant.

It is therefore one object of this invention to provide a simple method for reducing uranium.

It is another object of this invention to provide a method for reducing uranium which does not require the addition of large amounts of foreign material into the process stream.

Finally, it is the object of this invention to provide a method of reducing plutonium with uranium which is simple and which does not require that additional uranium be added to the process stream.

DETAILED DESCRIPTION OF THE INVENTION

These and other objects of the invention can be attained by adding tributyl phosphite [hereinafter referred to as TBP(III)] and a small quantity of phosphoric acid to the tributyl phosphate, dissolved in normal paraffin hydrocarbon (NPH) and nitric acid solution containing the uranium and plutonium values after decontamination to remove the fission products. After the TBP(III) has been added, the resulting solution is subjected to ultraviolet light radiation which reduces the uranium ion present from uranium (VI) to uranium (IV). As the uranium is being reduced, the TBP(III) is oxidized to TBP. The reduced uranium then reduces the plutonium present in the solution from plutonium (IV) to plutonium (III) and the solution is immediately ready for the next step in the process which is the partition cycle where the uranium and plutonium are separated.

The quantity of TBP(III) which must be added to TBP–NPH–acid solution is dependent upon the quantity of uranium ion which is present in the solution. In general, it has been determined that at least about 2.4 moles of TBP(III) must be added to the solution for each mole of uranium which is present and must be reduced. An amount less than this will result in poor yields due to incomplete reduction of the uranium present. Ratios greater than this may be used without any detrimental effects and may improve recovery slightly. Thus, to an organic solution which contains 0.25 M uranium (VI), 0.6 M of TBP(III) is necessary in order to achieve satisfactory uranium reduction.

The phosphoric acid which must be added to the solution is necessary to stabilize and solubilize the uranium (IV) which is formed and to prevent any back reaction. Generally, a quantity of from 0.073 M to 0.146 M was found to give quite good results. A smaller concentration will result in reduced reduction results, while a greater concentration will cause formation of a green uranium phosphate precipitate which will also reduce the reduction results.

The amount of light which is required to effect the uranium reduction is again dependent upon the amount of uranium present in the solution. At least two quanta of ultraviolet light per molecule of uranium was found necessary to give good results. Less than this amount will result in reduced yields. Ultraviolet obtained from an unfiltered mercury arc lamp proved to be very satisfactory.

The normal paraffin hydrocarbon used in the process contained 97 w/o of $C_{10}$ to $C_{14}$ straight-chain hydrocarbons. It had a specific gravity of 0.74 to 0.76 at 60° F. and had a flash point of 155°–160° F.

The rate of reduction of the uranium depends upon light intensity, the concentration of uranium in the solution being radiated and upon the concentration of TBP(III) in that solution; thus any change in these parameters will affect the amount of uranium (IV) which is formed.

To study the effect of irradiation time and phosphoric acid concentration upon the uranium reduction, a series of experiments were run in which these factors were varied. The solution contained 0.3 M uranium (VI), 0.2 M $HNO_3$, 30% TBP in NPH and $H_3PO_4$ and TBP(III). The solution was irradiated with ultraviolet light for 30 or 60 minutes.

TABLE 1

Phosphoric acid and TBP (III) effects and radiation time on U(IV) stability

| No. | Moles/liter initial | | | | | Moles/liter U(IV) after irradiation for— | |
|---|---|---|---|---|---|---|---|
| | U(VI) | HNO$_3$ | TBP | TBP (III) | H$_3$PO$_4$ | 30 min. | 60 min. |
| 1 | 0.15 | 0.1 | 0.55 | 1.85 | 0.000 | 0.81 | 0.086 |
| 2 | 0.15 | 0.1 | 0.55 | 1.85 | 0.073 | 0.078 | 0.11 |
| 3 | 0.15 | 0.1 | 0.55 | 1.85 | 0.146 | 0.070 | .12 |
| 4 | 0.15 | 0.1 | 0.55 | 1.85 | 0.438 | 0.060 | $^1$.054 |
| 5 | 0.24 | 0.16 | 0.88 | 0.61 | 0.244 | ($^2$) | $^1$.050 |

$^1$ Green precipitate after 1 hour.
$^2$ Not measured.

TABLE II.—ORGANIC PHASE REDUCTANT OF Pu(IV) BY U(IV)

| Exp. | Phases | | | | Pu d./m./ml. | |
|---|---|---|---|---|---|---|
| | Organic | Aqueous | V$_0$/V$_A$ | Pu D$_A^0$ | Organic | Aqueous |
| A-I | 30% TBP-"NPH", .3 M U, .2 M HNO$_3$ | 4 M HNO$_3$ | 1 | 3.1 | 2.87×10$^7$ | 9.28×10$^6$ |
| A-II | From A-I | Water | ½ | 0.5 | 9.44×10$^6$ | 8.36×10$^6$ |
| B-I | 25% TBP-"NPH", .6 M TBP (III), 0.25 M U, 0.17 M HNO$_3$, UV radiation ca. 1 hour. | 4 M HNO$_3$ | 1 | 0.07 | 2.80×10$^6$ | 3.82×10$^7$ |
| B-II | From B-I | Water | ½ | 0.028 | 3.84×10$^4$ | 1.38×10$^6$ |
| C-I | Same as A-I | 4 M HNO$_3$ | 1 | 3.3 | 2.56×10$^7$ | 7.68×10$^6$ |
| C-II | 1 ml. of org. A-I type plus 0.2 ml. of B-I type org | From C-I | 1 | 0.1 | 2.92×10$^6$ | 2.86×10$^7$ |
| C-III | From C-II | Water | ½ | 0.08 | 2.20×10$^5$ | 2.80×10$^6$ |

As can be seen in the table, best results were obtained when irradiation time of the solution was at least 60 minutes and the H$_3$PO$_4$ concentration was between 0.073 and 0.146 M.

The following examples are given as illustrative of the process of this invention and are not to be taken as limiting the scope or extent of the invention.

EXAMPLE I

In order to determine the effectiveness of TBP(III) and ultraviolet light as a method for reducing uranium ion, 20 to 25 ml. of a solution having the following composition was prepared: 0.14 M U(VI) as uranyl nitrate, 0.10 M HNO$_3$, 15 volume % TBP, 1.8 M TBP(III) and 0.08 M H$_3$PO$_4$ in a normal paraffin hydrocarbon solution.

The solution was subjected to 19×10$^{20}$ quanta ultraviolet light from an unfiltered mercury lamp. It was determined that the irradiated solution contained more than 90% of the initial U(VI) as U(IV).

EXAMPLE II

To check the effectiveness of this process to reduce plutonium in the organic phase, the following series of experiments were run. In each experiment, each phase contained 2 ml. and the phases were contacted for about 3 minutes at about 25° C., then centrifuged to separate the phases before samples were removed for alpha counting.

It can readily be seen from the results in experiment B-I, B-II and C-II, C-III that the use of the process of this invention does in fact effectively reduce the plutonium and permit its extraction from the organic solution. Calculations from the information obtained from the above experiments showed that 98% of the total plutonium was reduced to plutonium (III).

This method for the ultimate reduction of plutonium may be used in at least two different ways in conjunction with the Purex Process for the reprocessing of irradiated nuclear reactor fuels. For example, the TBP(III) and a small amount of H$_3$PO$_4$ can be added to the organic stream containing the uranium and plutonium before it enters the uranium-plutonium partition cycle. The resulting solution could then be subjected to ultraviolet light, which would then reduce the uranium, which would in turn reduce the plutonium present before the partition cycle is reached, so that when the aqueous phase is contacted, the plutonium would have the proper valence for extraction.

A variation of this method would be to divert a fraction of the organic stream containing the uranium and plutonium, add to it the TBP(III) and H$_3$PO$_4$ and irradiate this portion with ultraviolet light to reduce the uranium (VI) present as uranyl nitrate to uranium (IV). Then this solution is put back into the main organic stream of the partition cycle where the uranium (IV) reduces the plutonium (IV) to plutonium (III). An advantage of this method is that small volumes relative to the main stream are handled. Another advantage is that the isotopic composition of the uranium would not be disturbed. Since the uranium (IV), the active reductant, has the same isotopic composition as the uranium being processed, no problems in isotopic dilution occur as in the case where the uranium (IV) reductant comes from a source isotopically independent of the uranium freed.

It is to be understood that the method of this invention is not to be limited to the details given herein but that it may be modified within the scope of the appended claims.

The embodiments of the invention in which an exclusive property or privilege is claimed are defined as follows:

1. A method of reducing U(VI) to U(IV) when said uranium is present as uranyl nitrate and contained in a solution of tributyl phosphate in normal paraffin hydrocarbon and nitric acid comprising: adding to said solution at least 2.4 moles of tributyl phosphite for each mole of uranium present therein, making said solution from 0.073 to 0.146 M in phosphoric acid, and irradiating the resulting solution with at least two quanta of ultraviolet light per molecule of uranium present in the solution, said ultraviolet light originating from an unfiltered mercury arc lamp whereby said uranium present is reduced to U(IV) and said tributyl phosphite present is oxidized to tributyl phosphate.

2. In the method of reducing Pu contained with U(VI) in a solution of tributyl phosphate in normal paraffin hydrocarbon and nitric acid to Pu(III) by contacting said Pu with U(IV), an improvement in the method of reducing U(VI) to U(IV) comprising: adding at least 2.4 moles tributyl phosphite per mole of U present, making said solution from 0.073 to 0.146 M in phosphoric acid and irradiating said solution with at least two quanta ultraviolet light per molecule of U present in the solution, said ultraviolet light originating from an unfiltered mercury arc lamp whereby said U present is reduced to U(IV) and said tributyl phosphite is oxidized to tributyl phosphate.

\* \* \* \* \*